Dec. 23, 1969    J. H. ZIEGLER    3,485,060
LIVESTOCK BRANDING APPARATUS
Filed May 16, 1968    2 Sheets-Sheet 1
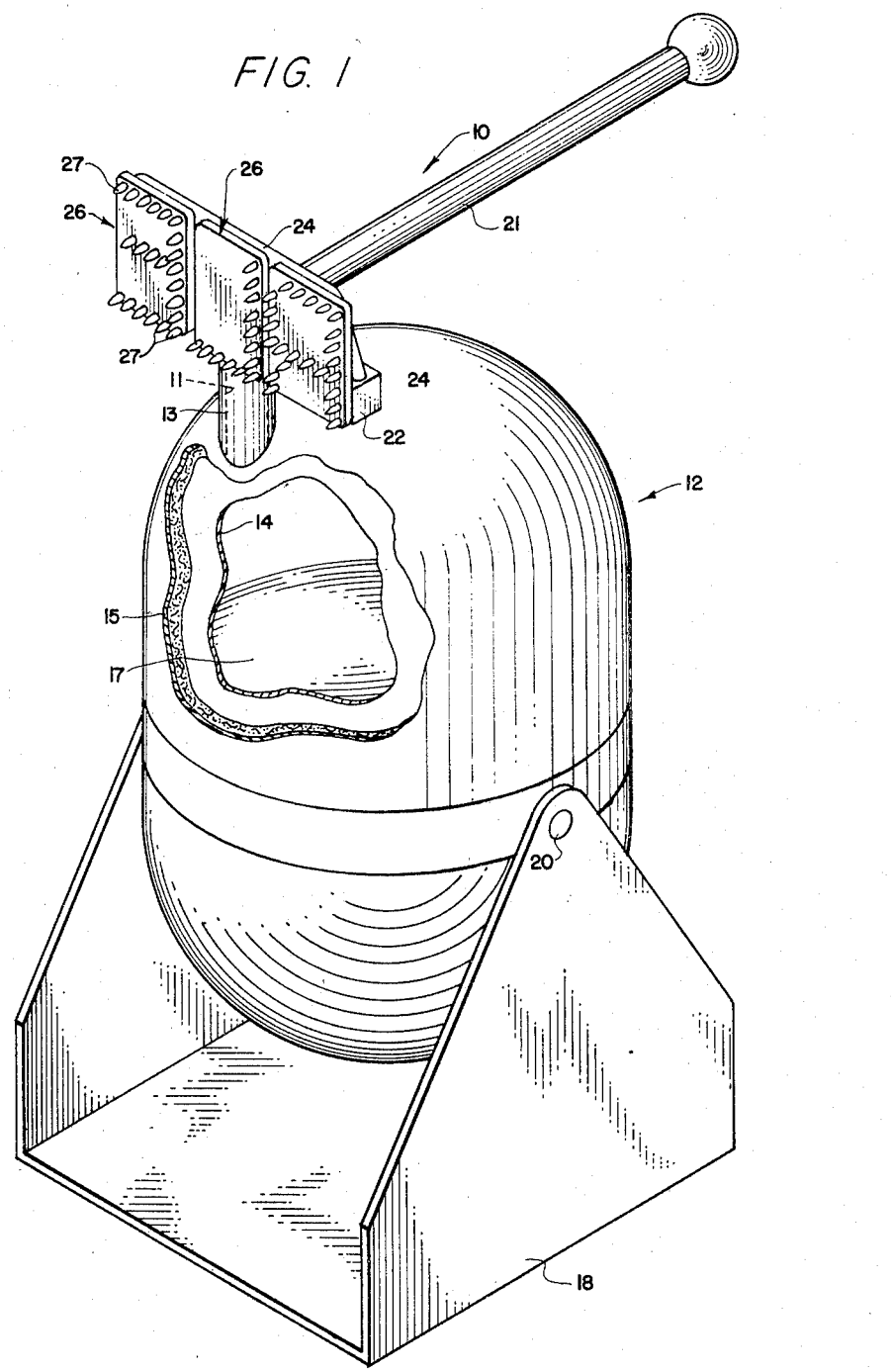
INVENTOR.
JOHN H. ZIEGLER
BY *Hubert Miller*
ATTORNEY Dec. 23, 1969         J. H. ZIEGLER         3,485,060
            LIVESTOCK BRANDING APPARATUS
Filed May 16, 1968                    2 Sheets-Sheet 2
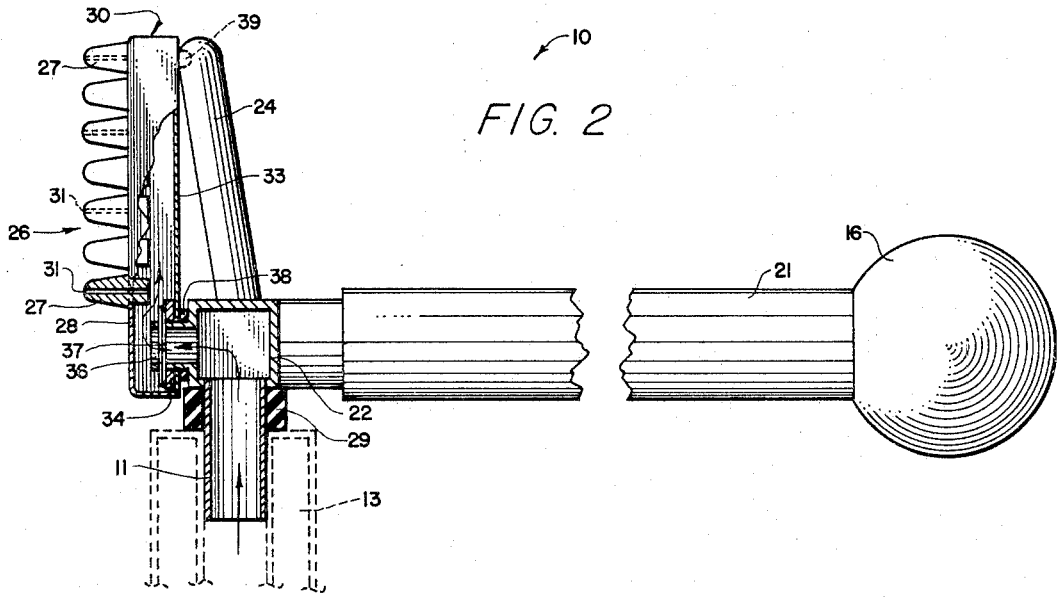
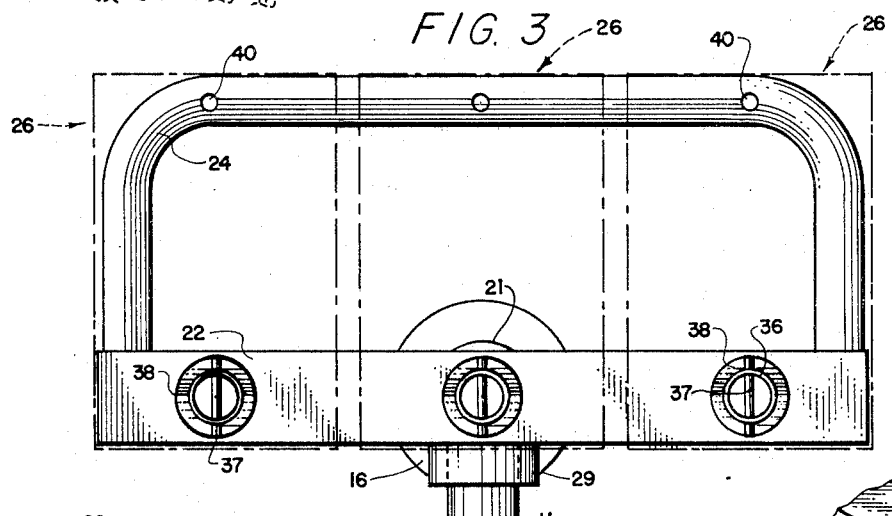
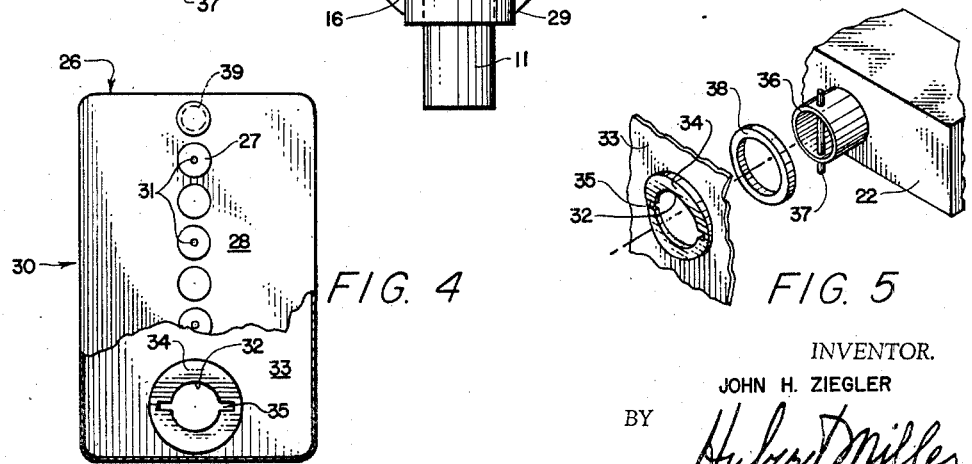
INVENTOR.
JOHN H. ZIEGLER
BY *Hubert Miller*
ATTORNEY

United States Patent Office 3,485,060
Patented Dec. 23, 1969

3,485,060
LIVESTOCK BRANDING APPARATUS
John H. Ziegler, Longmont, Colo., assignor to Beech Aircraft Corporation, Wichita, Kans., a corporation of Delaware
Filed May 16, 1968, Ser. No. 729,621
Int. Cl. A01k *11/00;* F25d *3/10*
U.S. Cl. 62—293                                    9 Claims

ABSTRACT OF THE DISCLOSURE

A low temperature livestock branding tool which freezes rather than burns the skin of the animal in a predetermined contour. The freezing temperature is applied to the skin by a series of closely spaced, firmly supported, highly conductive fingers, the outer ends of which penetrate the hair and directly contact closely spaced areas of the skin. In time, the hair growing from the frozen skin areas becomes white, creating a permanent and clearly discernible brand, all within any damage to the hide of the animal.

---

Branding of cattle has been the traditional method of identification in this country since early times. The brand an animal carries usually determines legal ownership. State and Federal agencies control the sale and interstate movement of cattle through brand identification.

The standard method has always been the use of a heated iron shaped to particular letters or brand symbol, and brought directly into contact with the animal's hide. A proper brand by this method produces a mild trauma on the skin which is open to infection.

The present invention is concerned with cryogenic techniques of branding rather than high temperature methods. The process involves freezing a small area of the animal's skin long enough to kill the pigment-producing cells (melanocytes) of the hair. The hair in the exposed area soon falls out and is replaced by a growth of white hair which is a permanent marking. Freeze branding has numerous advantages over high temperature methods, aside from eliminating the danger of infection. In some cases the surrounding hair will grow over a high temperature brand, making identification more difficult, whereas with the freeze method the brand is always clearly discernible from a distance. A high temperature brand, contrary to the present technique, leaves scar tissue in the hide which grows in size with the animal. To some users of leather this scarred area, caused by the brand, must be cut out of the hide and discarded.

Previous techniques, utilizing the low temperature method, have found it necessary to clip the animal's hair where the iron is to be applied, because of the insulating effect caused by the hair. Other methods, such as spraying Freon gas over a stencil, have been used but they also require clipping the animal's hair. Clipping alone takes more time than applying the iron, and under some conditions is difficult to perform.

The present invention has alleviated the above mentioned problems in low temperature branding by providing a tool having a plurality of elongate fingers which penetrate the hair and directly contact the animal's skin in closely spaced small areas.

It is therefore the principal object of the present invention to provide a new and improved low temperature branding apparatus for use on livestock.

Another object of the invention is to provide a low temperature branding tool which penetrates the hair of an animal and directly contacts the skin at a plurality of closely spaced areas, forming the outline of the brand.

A further object of the invention is to provide a low temperature branding tool which is so constructed that various branding letters and symbols are interchangeable.

A still further object of the invention is to provide a low temperature branding tool capable of receiving and holding a liquid refrigerant whereby the branding fingers are cooled to a branding temperature by the evaporation of the refrigerant.

Another object of the invention is to provide a cryogenic branding apparatus which includes a portable vacuum bottle containing a vaporizable liquid, and a contact branding tool with a refrigerant chamber, said tool being releasably attachable to said container in preparation for use, whereby the liquid flows into the tool to maintain the tool at the proper branding temperature.

Still another object of the invention is to provide a readily portable cryogenic branding apparatus with a minimum of evaporation and a rugged maintenance free construction.

Other objects and advantages of the invention will become apparent to those skilled in the art by reference to the following detailed description.

While the invention is susceptible to various modifications and alternative constructions, certain illustrative embodiments have been shown in the drawings and are described in detail. It should be understood, however, that there is no intention to limit the invention to the specific forms disclosed but, on the contrary, the invention is to cover all modifications, alternatives and equivalents falling within the spirit and scope of the appended claims.

Referring to the drawings:

FIG. 1 is a perspective view of a branding tool embodying the invention, mounted on a Dewar vessel ready to receive liquid refrigerant;

FIG. 2 is a side elevation view of the branding tool, partially in section, with the mouth of the Dewar bottle shown in dotted line;

FIG. 3 is a front elevation of the iron with the outline of each removable brand symbol shown in dotted line;

FIG. 4 is a front elevation view partially in section of an individual brand symbol mounting box; and FIG. 5 is a perspective exploded view of the releasable fitting which attaches each separate brand symbol to the tool.

Referring now to the drawings for a detailed description of the invention and more specifically to FIG. 1, the branding tool is generally identified by reference numeral 10. The tool 10 is shown mounted on the Dewar vessel 12 with a filler tube 11 (FIG. 2) inserted in the neck 13 of the vessel. The Dewar 12 is a conventional structure, having inner and outer shells 14 and 15, which define an evacuated chamber therebetween. Located at the upper end of the Dewar is a filler neck 13. Inside the Dewar 12 is a low temperature vaporizable refrigerant 17, such as liquid nitrogen, Freon 12 or liquid oxygen, which provides the chilling medium. In its storage position the Dewar 12 is positioned in an upright manner, as seen in FIG. 1. The Dewar 12 is pivotally mounted on a stand 18 by lockable pivot pins 20. When it is desired to chill the tool 10, the Dewar 12 is pivoted downward allowing the liquid 17 to run through the neck 13 into the tool 10. The Dewar is left in this position until the animal is ready for branding at which time the Dewar is tilted back to its upright position, allowing a major portion of the unvaporized fluid 17 contained in the tool 10 to flow back into the Dewar.

The tool 10, as best seen in FIG. 2, includes an insulated handle 21 centrally attached to a manifold 22. The enlarged end portion 16 of the handle 21 merely assists in the handling of the tool by the operator. The filler tube 11 connects to the interior of the manifold 22 and extends downwardly therefrom for insertion into the neck of the Dewar 12. A sponge rubber sleeve 29, surrounding the tube 11, assists in sealing the filler tube 11 to the filler neck 13 of the Dewar 12. The manifold 22, together with a U-shaped tubular support member 24, constitute a mounting frame for a plurality of interchangeable brand symbols 26 mounted on individual box structures 30. While FIGS. 1 and 3 illustrate a tool 10 with three brand symbols 26, the mounting frame can be made to accommodate a greater or less number of symbols, depending upon the need. The branding symbols 26 are made up of a series of finger-like elements 27 with one end of each fixed in one side wall of a sheet metal box 30. The interior of the box 30 defines a plenum chamber for receiving a liquid refrigerant. The tapered fingers 27 which are constructed of a highly conductive metal, extend a substantial distance into the interior of the box 30 (FIG. 2) to provide maximum surface contact with the liquid refrigerant. By reason of the conduction properties of the finger elements 27 their outer tips are kept at a temperature very near that of the vaporizable liquid refrigerant. In FIG. 2 the fingers 27 are alternately shown with open ducts 31 extending the full length of the finger to provide a vent for the expanding gases from the vaporizing refrigerant.

The box structure 30 is illustrated in detail in FIG. 4, with a portion of the front wall 28 broken away. The fingers 27 are mounted in the front wall 28 of the box 30, while the filler opening 32 for the box is located in the back wall 33. Surrounding the opening 32, and rigidly attached to the wall 33, is a cam-shaped washer 34 having a transverse slot 35 therein at the thinnest portion of the washer, as seen in the exploded view of FIG. 5. The slotted washer 34 is adapted to snugly receive a tubular fitting 36 attached to a wall of the manifold 22, said fitting having a transverse pin 37 passing through its outer end. To mount one of the boxes 30 on the manifold, it must be turned 90° from its FIG. 4 position so that the slot 35 is vertically aligned to receive pin 37. Once the pin 37 has passed through the washer 34, the box 30 is rotated back to its FIG. 4 position. As the element 26 rotates, pin 37 rides up the thicker portion of washer 34 in a camming action, causing the back wall 33 of box 30 to tightly seal against an elastic washer 38, as shown in FIG. 2. In the exploded view of FIG. 5, the fragmentary portion of the box 30 is shown rotated to its sealed position. Extending toward the mounting frame from the rear wall 33 of the box is a detent 39 as seen in FIGS. 2 and 4. When the box 30 is rotated to its sealed upright position (FIG. 3), detent 39 engages an opening 40 in the tubular support member 24, thus locking the box in its branding position. In FIG. 3 the outline of each of the composite branding symbols 26 is illustrated by dotted line in a side-by-side relation, with a space therebetween to permit the individual boxes 30 to rotate without contacting the adjoining box. The center box can not be removed from the manifold 22 until one of the side boxes has been first removed.

OPERATION

The Dewar vessel 12 is relatively small and can be easily transported from the source of cryogenic liquid to any place in the field. When not in use the Dewar 12 is left in an upright position as illustrated in FIG. 1, with the tool 10 or some form of cap on the neck 13 to minimize loss of the refrigerant by evaporation. Shortly prior to using the tool 10 the Dewar 12 is tilted about its pivotal mounting 20 until the refrigerant flows out the neck 13 and into the tool. The refrigerant flows through the filler tube 11, into the manifold 22, and fills each of the brand symbol boxes 30 through the individual fittings 36, as illustrated by the arrows in FIG. 2. The ducts 31 in the fingers 27 provide vents for the expanding gases caused by the evaporating refrigerant. When the operator is ready to brand the animal, the Dewar 12 is tilted back to its FIG. 1 position, allowing the cryogenic liquid in the tool to run back into the Dewar vessel. The tool 10, now in its chilled condition, is separated from the Dewar and is ready to brand the animal.

As the branding tool 10 is brought into contact with the animal's hide, the free ends of fingers 27 pass through the hair and directly contact the skin. The contact points of the fingers freeze small areas of the skin. This freezing ultimately produces a permanent white growth of hair. By closely spacing the fingers 27 the frozen areas are contiguous, thereby giving the brand the appearance of a solid line.

Having described the invention with sufficient clarity to enable those familiar with the art to construct and use it, I claim:

1. A low temperature branding tool for use on livestock and the like which freezes small areas of the animal's skin, killing the pigment producing cells, comprising:
   an insulated handle (21);
   one or more branding symbols (26) made up of a plurality of thermally conductive finger elements (27) arranged in closely spaced side-by-side relation, with the outer ends of the fingers lying in a common plane and constituting the hide contacting means; and
   mounting means for supporting the finger elements in fixed, spaced relation and connecting the elements to said handle.

2. A low temperature branding tool as set forth in claim 1 wherein the mounting means includes a hollow box structure (30) for each of said symbols defining a plenum chamber for receiving a vaporizable refrigerant.

3. A low temperature branding tool as set forth in claim 1 wherein the mounting means includes a hollow box structure (30) having a front wall for each of said symbols, the box structure defining a plenum chamber for receiving a vaporizable refrigerant, the finger elements each having one end portion mounted in the front wall with a substantial portion thereof extending well into the interior of said plenum chamber.

4. A low temperature branding tool as set forth in claim 1 wherein the mounting means includes a hollow box structure (30), for each branding symbol, defining a plenum chamber therein having front and rear walls (28 and 33), the finger elements being mounted in the front wall, each finger having one end portion extending into the interior of the chamber;
   an opening (32) in said rear wall;
   manifold means (22) supported on said handle for receiving and distributing a vaporizable refrigerant to a plurality of said box structures; and
   fitting means on said manifold releasably connecting a plurality of said box structures to the manifold, with the opening in the rear wall of each box structure in communication with the interior of said manifold means.

5. A low temperature branding tool as set forth in claim 1 wherein the finger elements (27) are substantially circular in cross section and are tapered toward their outer ends.

6. A low temperature branding tool as set forth in claim 4 wherein the finger elements are substantially circular in cross section, are tapered toward their respective outer ends, and are provided with longitudinal ducts which serve as vents for each plenum chamber.

7. A low temperature branding apparatus for use with livestock and the like which freezes portions of the animal's skin comprising:
   a thermally insulated vessel having a filler tube through which a supply of cryogenic liquid may be introduced into the vessel;
   a branding tool including a hollow box structure defining a plenum chamber;
   a handle member connected to the box structure;
   a plurality of thermally conductive finger elements mounted in the box structure and extending outwardly therefrom, the finger elements being arranged in closely spaced side-by-side relationship in the form of a brand symbol; and filler means affording introduction of cryogenic liquid into the plenum chamber, said filler means also being connected to the handle and being releasably connectible to the filler tube of the vessel, so that liquid can be transferred from the vessel into said plenum chamber.

8. A low temperature branding apparatus as set forth in claim 7 wherein the branding tool includes a plurality of box structures, and the filler means includes a manifold having a plurality of releasable fittings thereon which receive and support the individual box structures; and a filler tube connected to the manifold and releasably connectible to the filler tube of said vessel.

9. A low temperature branding apparatus as set forth in claim 7 wherein the finger elements extend a substantial distance into said plenum chamber, the portions of the fingers extending outwardly from the box structure being tapered with a longitudinal duct passing through the respective fingers and providing vents for the plenum chamber.

References Cited

UNITED STATES PATENTS

| | | | |
|---|---|---|---|
| 3,358,648 | 12/1967 | Berens | 62—293 X |
| 3,411,483 | 11/1968 | Conoy | 62—293 X |

WILLIAM J. WYE, Primary Examiner

U.S. Cl. X.R.

119—1